US012683062B2

(12) United States Patent
Chang et al.

(10) Patent No.: US 12,683,062 B2
(45) Date of Patent: Jul. 14, 2026

(54) INDUCTOR

(71) Applicant: Realtek Semiconductor Corporation, Hsinchu (TW)

(72) Inventors: Chieh-Pin Chang, Hsinchu (TW); Cheng-Wei Luo, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 1073 days.

(21) Appl. No.: 17/805,691

(22) Filed: Jun. 7, 2022

(65) Prior Publication Data

US 2023/0282407 A1 Sep. 7, 2023

(30) Foreign Application Priority Data

Mar. 7, 2022 (TW) ................................. 111108264

(51) Int. Cl.
*H01F 27/28* (2006.01)
*H01F 27/34* (2006.01)

(52) U.S. Cl.
CPC ......... *H01F 27/2823* (2013.01); *H01F 27/34* (2013.01)

(58) Field of Classification Search
CPC ............................. H01F 27/2823; H01F 27/34
See application file for complete search history.

(56) References Cited

U.S. PATENT DOCUMENTS 6,967,555 B2* 11/2005 Yu ....................... H01F 17/0013 336/200
2009/0284339 A1* 11/2009 Choi ................... H01F 17/0013 336/200
2012/0319779 A1* 12/2012 Kim .................... H01F 27/2804 330/277
2013/0154783 A1* 6/2013 Kato ....................... H01F 19/04 336/200
2015/0170824 A1* 6/2015 Tesson ................ H01F 27/2804 336/190
2015/0364243 A1* 12/2015 Yen ..................... H01F 27/2804 336/200
2017/0271076 A1 9/2017 Luo et al.
2018/0040412 A1* 2/2018 Yen ......................... H01F 27/29
2019/0214175 A1* 7/2019 Yen ......................... H01F 41/06
2019/0214185 A1* 7/2019 Yen ..................... H01F 27/2823
2019/0252110 A1* 8/2019 Yen ......................... H01F 27/29
2019/0392980 A1* 12/2019 Yen ..................... H01F 27/2828
2020/0251550 A1* 8/2020 Yen .......................... H10D 1/20
(Continued)

FOREIGN PATENT DOCUMENTS

CN 104733429 A 6/2015
TW 201931665 A 8/2019

*Primary Examiner* — Malcolm Barnes
(74) *Attorney, Agent, or Firm* — CKC & Partners Co., LLC

(57) ABSTRACT

An inductor device includes a first wire and a second wire. The first wire includes a first sub-wire and a second sub-wire. The first sub-wire is disposed in a first area. The second sub-wire is disposed in a second area, and the first sub-wire and the second sub-wire are located on different layers. The second wire includes a third sub-wire and a fourth sub-wire. The third sub-wire is disposed in the second area, and located below the second sub-wire. The fourth sub-wire is disposed in the first area, the third sub-wire and the fourth sub-wire are located on different layers, and the fourth sub-wire is located above the first sub-wire.

16 Claims, 4 Drawing Sheets

(56) References Cited

U.S. PATENT DOCUMENTS

| | | | | |
|---|---|---|---|---|
| 2020/0312511 | A1* | 10/2020 | Yen | H01F 27/29 |
| 2020/0312512 | A1* | 10/2020 | Yen | H01F 27/2828 |
| 2020/0312530 | A1* | 10/2020 | Yen | H01F 17/0013 |
| 2020/0336113 | A1* | 10/2020 | Pan | H03F 3/604 |
| 2020/0343334 | A1* | 10/2020 | Yen | H01L 23/528 |

* cited by examiner

INDUCTOR

RELATED APPLICATIONS

This application claims priority to Taiwan Patent Application No. 111108264, filed Mar. 7, 2022, the entirety of which is herein incorporated by reference.

BACKGROUND

Field of Invention

The present invention relates to an electrical device, and more particularly, an inductor device.

Description of Related Art

Conventional 8-shaped inductor can reduce signal interference generated between wires. However, 8-shaped inductors occupy larger area, which is not beneficial for electronic devices to become thinner and smaller.

In view of the foregoing, problems and disadvantages are associated with existing products that require further improvement. However, those skilled in the art have yet to find a solution.

SUMMARY

An embodiment of the present disclosure is related to an inductor device, and the inductor device includes a first wire and a second wire. The first wire includes a first sub-wire and a second sub-wire. The first sub-wire is disposed in a first area. The second sub-wire is disposed in a second area, and the first sub-wire and the second sub-wire are located on different layers. The second wire includes a third sub-wire and a fourth sub-wire. The third sub-wire is disposed in the second area, and located below the second sub-wire. The fourth sub-wire is disposed in the first area, the third sub-wire and the fourth sub-wire are located on different layers, and the fourth sub-wire is located above the first sub-wire.

Therefore, based on the technical content of the present disclosure, the structures of the inductor of the present disclosure are stacked with each other. Compared with conventional inductor not adopting stacked structure, the area of the inductor of the present disclosure reduces.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Figure 1:
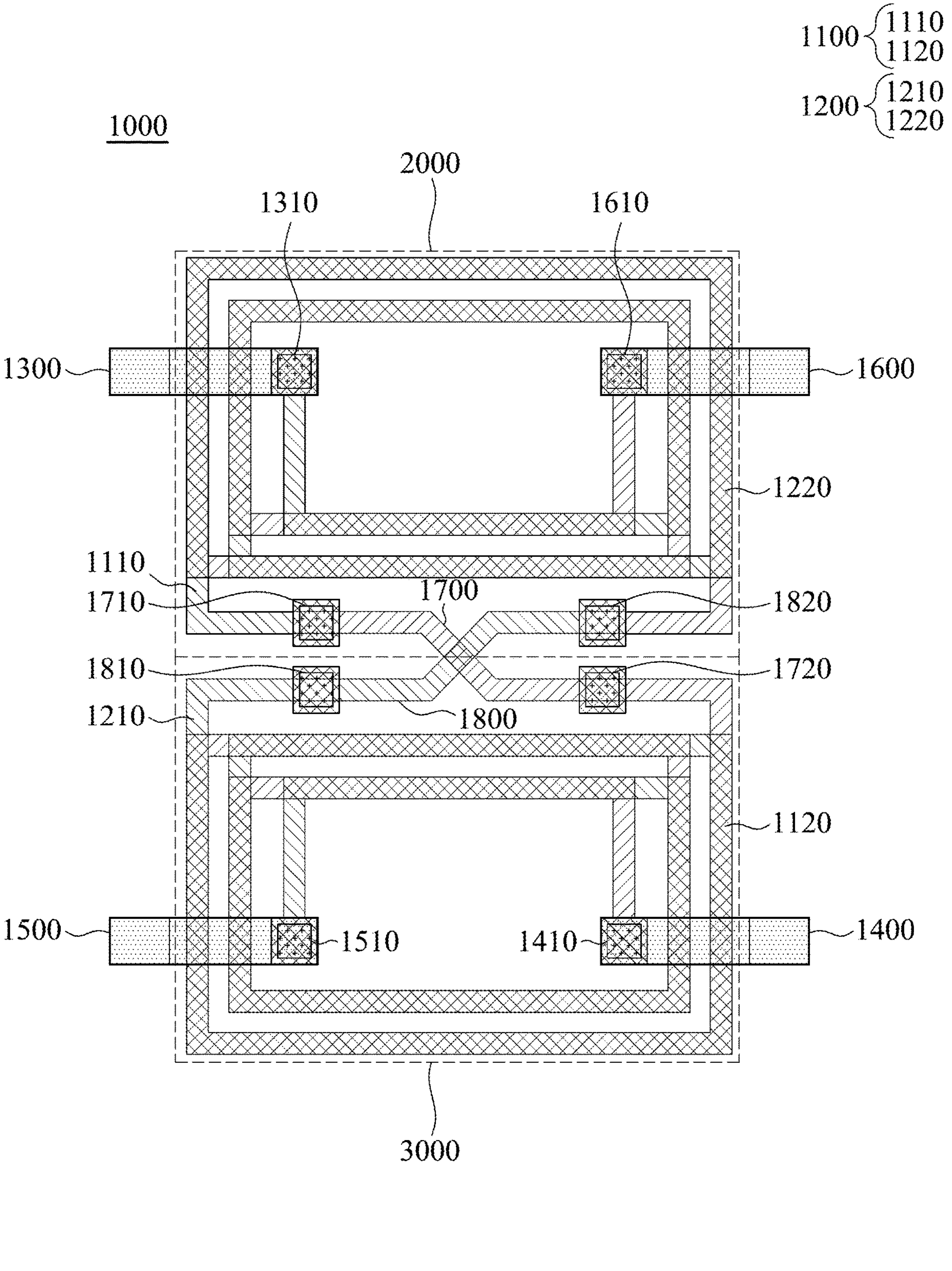
FIG. 1 is a schematic diagram of an inductor device according to one embodiment of the present disclosure.

According to the usual mode of operation, various features and elements in the figures have not been drawn to scale, which are drawn to the best way to present specific features and elements related to the disclosure. In addition, among the different figures, the same or similar element symbols refer to similar elements/components.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of “a”, “an”, and “the” includes reference to the plural unless the context clearly dictates otherwise. Also, as used in the description herein and throughout the claims that follow, the terms “comprise or comprising”, “include or including”, “have or having”, “contain or containing” and the like are to be understood to be open-ended, i.e., to mean including but not limited to. As used in the description herein and throughout the claims that follow, the meaning of “in” includes “in” and “on” unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term “and/or” includes any and all combinations of one or more of the associated listed items.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of an inductor device 1000 according to one embodiment of the present disclosure. As shown in the figure, the inductor 1000 includes a first wire 1100 and a second wire 1200. The first wire 1100 includes a first sub-wire 1110 and a second sub-wire 1120. Besides, the second wire 1200 includes a third sub-wire 1210 and a fourth sub-wire 1220.

Figure 2:
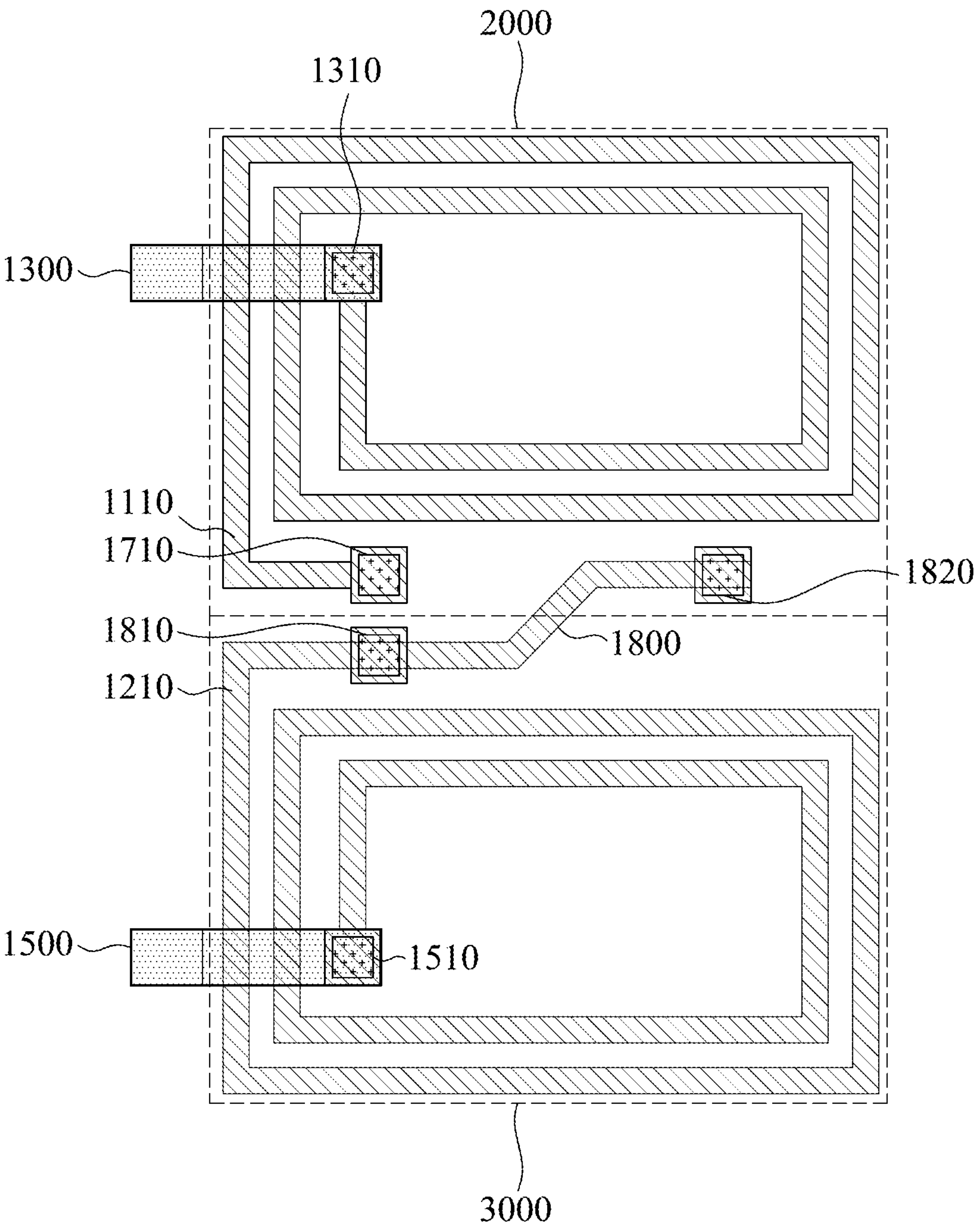
FIG. 2 is a schematic diagram of partial structures of the inductor device shown in FIG. 1 according to one embodiment of the present disclosure.
Figure 3:
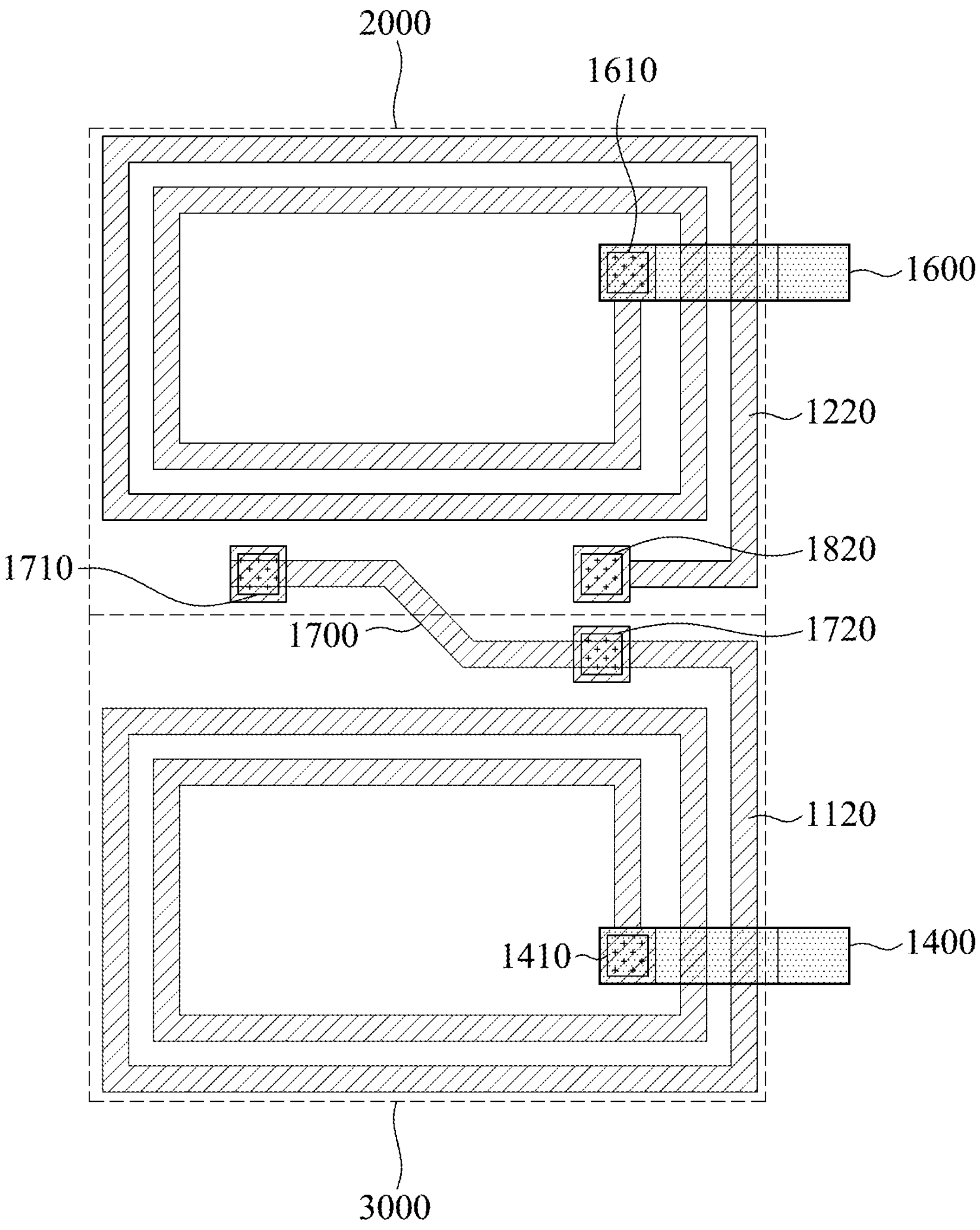
FIG. 3 is a schematic diagram of partial structures of the inductor device shown in FIG. 1 according to one embodiment of the present disclosure.

For facilitating the understanding to the structure of the inductor 1000 of the present disclosure, the inductor 1000 in FIG. 1 is separated into partial structures in FIG. 2 and partial structures in FIG. 3. FIG. 2 and FIG. 3 are schematic diagrams of partial structures of the inductor device 1000 shown in FIG. 1 according to one embodiment of the present disclosure.

Referring to FIG. 2, the first sub-wire 1110 is disposed in a first area 2000 (e.g., the upper half area in the figure), and the third sub-wire 1210 is disposed in a second area 3000 (e.g., the lower half area in the figure).

In one embodiment, the first sub-wire 1110 (e.g., a winding) is wound along a first direction, and the third sub-wire 1210 is wound along a second direction wound. The first direction and the second direction are opposite. For example, the first direction includes a counterclockwise direction, and the second direction includes a clockwise direction.

In another embodiment, the inductor 1000 further includes a first input/output element 1300, and the first input/output element 1300 is coupled to an inner side of the first sub-wire 1110. For example, the first input/output element 1300 can be coupled to an inner side of the first sub-wire 1110 through a via 1310. Besides, the inductor 1000 further includes a third input/output element 1500, and the third input/output element 1500 is coupled to an inner side of the third sub-wire 1210. For example, the third input/output element 1500 can be coupled to an inner side of the third sub-wire 1210 through a via 1510.

Referring to FIG. 3, the fourth sub-wire 1220 is disposed in the first area 2000 (e.g., the upper half area in the figure), and the second sub-wire 1120 is disposed in the second area 3000 (e.g., the lower half area in the figure).

In one embodiment, the fourth sub-wire 1220 is wound along the first direction, and the second sub-wire 1120 is wound along the second direction. The first direction and the second direction are opposite. For example, the first direction includes a counterclockwise direction, and the second direction includes a clockwise direction.

In another embodiment, the inductor 1000 further includes a fourth input/output element 1600, and the fourth input/output element 1600 is coupled to an inner side of the fourth sub-wire 1220. For example, the fourth input/output element 1600 can be coupled to an inner side of the fourth sub-wire 1220 through a via 1610. Besides, the inductor 1000 further includes a second input/output element 1400, and the second input/output element 1400 is coupled to an inner side of the second sub-wire 1120. For example, the second input/output element 1400 can be coupled to an inner side of the second sub-wire 1120 through a via 1410.

Reference is now made to FIG. 3. The inductor 1000 further includes a first connection element 1700, and the first connection element 1700 is configured to couple to the second sub-wire 1120 and the first sub-wire 1110 shown in FIG. 2. For example, the first connection element 1700 shown in FIG. 3 can be coupled to the second sub-wire 1120 through a second via 1720. Besides, the first connection element 1700 shown in FIG. 3 can be coupled to the first sub-wire 1110 shown in FIG. 2 through a first via 1710.

Referring to FIG. 2, the inductor 1000 further includes a second connection element 1800, and the second connection element 1800 is configured to couple to the third sub-wire 1210 and the fourth sub-wire 1220 shown in FIG. 3. For example, the second connection element 1800 shown in FIG. 2 can be coupled to the third sub-wire 1210 through a third via 1810. Besides, the second connection element 1800 shown in FIG. 2 can be coupled to the fourth sub-wire 1220 shown in FIG. 3 through a fourth via 1820.

Referring to FIG. 2, the first sub-wire 1110 and the third sub-wire 1210 are located on the first layer. Referring to FIG. 3, the second sub-wire 1120 and the fourth sub-wire 1220 are located on the second layer. Therefore, the first sub-wire 1110 and the second sub-wire 1120 are located on different layers, and the third sub-wire 1210 and the fourth sub-wire 1220 are located on different layers. Referring to FIG. 1, the first sub-wire 1110 and the fourth sub-wire 1220 are all disposed in the first area 2000 (e.g., the upper half area in the figure), and the fourth sub-wire 1220 is located above the first sub-wire 1110. Besides, the second sub-wire 1120 and the third sub-wire 1210 are all disposed in the second area 3000 (e.g., the lower half area in the figure), and the second sub-wire 1120 is located above the third sub-wire 1210.

Since the first sub-wire 1110 to the fourth sub-wire 1220 of the inductor 1000 of the present disclosure are stacked with each other, the area of the inductor 1000 of the present disclosure is reduced to about 50 um×70 um. Compared with conventional inductor not adopting stacked structure (e.g., the area is about 70 um×78 um), the area of the inductor 1000 of the present disclosure reduces about 35.9%.

Besides, the first sub-wire 1110 and the fourth sub-wire 1220 are all wound along the first direction, and the second sub-wire 1120 and the third sub-wire 1210 are all wound along the second direction. Since the wound directions of the first sub-wire 1110 and the fourth sub-wire 1220 of the inductor 1000 of the present disclosure are opposite to the wound direction of the second sub-wire 1120 and the third sub-wire 1210, the signal interference in the inductor 1000 is decreased efficiently.

In one embodiment, the first input/output element 1300 is overlapped with the first sub-wire 1110 and the fourth sub-wire 1220. The fourth input/output element 1600 is overlapped with the first sub-wire 1110 and the fourth sub-wire 1220. The first input/output element 1300 and the fourth input/output element 1600 are all located in the first area 2000 (e.g., the upper half area in the figure), and the first input/output element 1300 and the fourth input/output element 1600 are located on different sides (e.g., the left side and the right side in the figure) of the first area 2000 (e.g., the upper half area in the figure).

In another embodiment, the second input/output element 1400 is overlapped with the second sub-wire 1120 and the third sub-wire 1210. The third input/output element 1500 is overlapped with the second sub-wire 1120 and the third sub-wire 1210. The second input/output element 1400 and the third input/output element 1500 are all located in the second area 3000 (e.g., the lower half area in the figure), and the second input/output element 1400 and the third input/output element 1500 are located on different sides (e.g., the left side and the right side in the figure) of the second area 3000 (e.g., the lower half area in the figure). Besides, as shown in the figure, the first connection element 1700 and the second connection element 1800 are disposed to each other at the center of the inductor 1000 in an interlaced manner (e.g., crossing). However, the present disclosure is not limited to the structure as shown in FIG. 1 to FIG. 3, and it is merely an example for illustrating one of the implements of the present disclosure.

Figure 4:
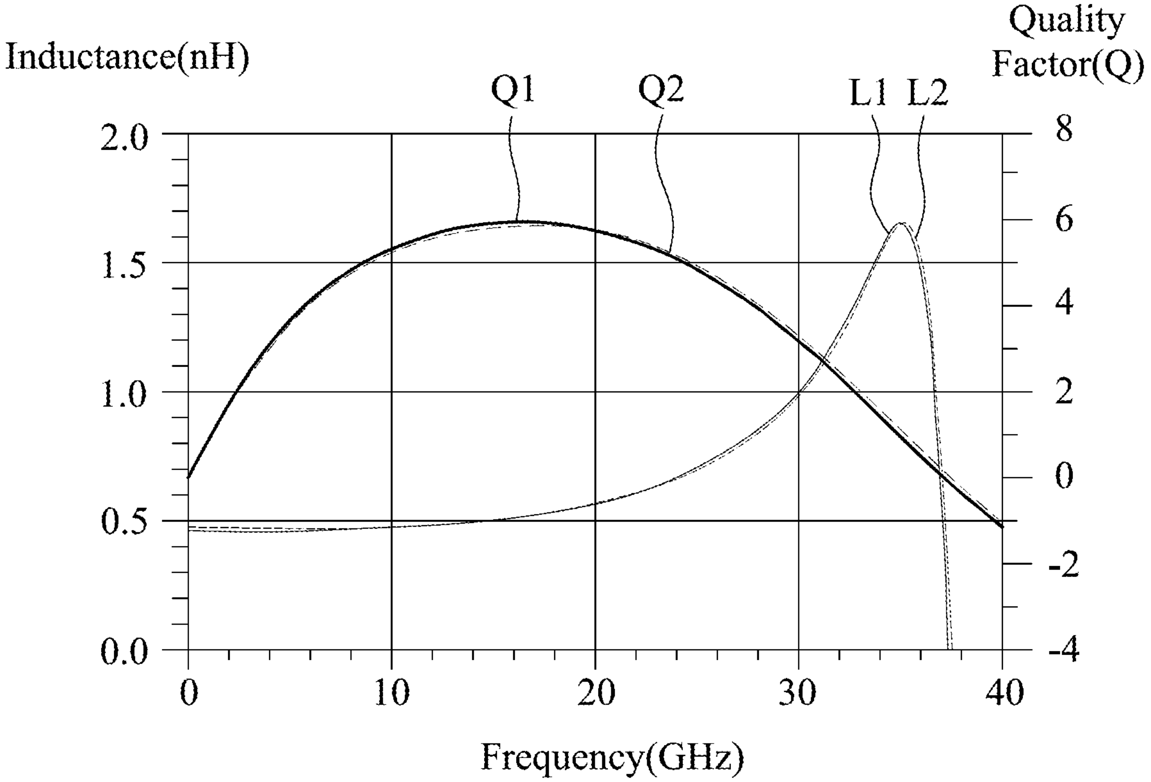
FIG. 4 depicts a schematic diagram of experimental data of an inductor device according to one embodiment of the present disclosure.

FIG. 4 depicts a schematic diagram of experimental data of an inductor device 1000 according to one embodiment of the present disclosure. The experimental data illustrates the quality factor (Q) and the inductance of the inductor 1000 at different frequencies. As shown in the figure, the experimental curves of the quality factor of the first wire 1100 and the second wire 1200 of the inductor device 1000 adopting the structural configuration of the present disclosure are Q1 and Q2. Besides, the experimental curves of the inductance values of the first wire 1100 and the second wire 1200 of the inductor 1000 are L1 and L2. As can be seen in experimental data in FIG. 4, inductance values of the first wire 1100 and the second wire 1200 of the inductor 1000 of the present disclosure are extremely similar to each other. In view of the above, the symmetric structures in the first wire 1100 and the second wire 1200 of the inductor 1000 of the present disclosure can maintain the efficiency of the inductor 1000.

It can be understood from the embodiments of the present disclosure that application of the present disclosure has the following advantages. The structures of the inductor 1000 of the present disclosure are stacked with each other. Compared with conventional inductor not adopting stacked structure, the area of the inductor 1000 of the present disclosure reduces. Besides, since the wound directions of the first sub-wire 1110 and the fourth sub-wire 1220 of the inductor 1000 of the present disclosure are opposite to the wound direction of the second sub-wire 1120 and the third sub-wire 1210, the signal interference in the inductor 1000 is decreased efficiently.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor, comprising:

a first wire, comprising:

a first sub-wire, disposed in a first area; and a second sub-wire, disposed in a second area, wherein the first sub-wire and the second sub-wire are located on different layers;

a second wire, comprising:

a third sub-wire, disposed in the second area, and located below the second sub-wire; and a fourth sub-wire, disposed in the first area, wherein the third sub-wire and the fourth sub-wire are located on different layers, and the fourth sub-wire is located above the first sub-wire;

a first input/output element, coupled to an inner side of the first sub-wire, and overlapped with the first sub-wire and the fourth sub-wire; and a second input/output element, coupled to an inner side of the second sub-wire, and overlapped with the second sub-wire and the third sub-wire;

wherein the first sub-wire and the fourth sub-wire are wound along a first direction, wherein the second sub-wire and the third sub-wire are wound along a second direction, wherein the first direction and the second direction are opposite.

2. The inductor of claim 1, wherein the first sub-wire and the third sub-wire are located on a first layer, and the second sub-wire and the fourth sub-wire are located on a second layer.

3. The inductor of claim 1, wherein the first direction comprises a counterclockwise direction.

4. The inductor of claim 3, wherein the second direction comprises a clockwise direction.

5. The inductor of claim 1, further comprising:

a third input/output element, coupled to an inner side of the third sub-wire, and overlapped with the second sub-wire and the third sub-wire.

6. The inductor of claim 5, further comprising:

a fourth input/output element, coupled to an inner side of the fourth sub-wire, and overlapped with the first sub-wire and the fourth sub-wire.

7. The inductor of claim 6, wherein the first input/output element and the fourth input/output element are all located in the first area.

8. The inductor of claim 7, wherein the first input/output element and the fourth input/output element are located on different sides of the first area.

9. The inductor of claim 8, wherein the second input/output element and the third input/output element are all located on the second area.

10. The inductor of claim 9, wherein the second input/output element and the third input/output element are located on different sides of the second area.

11. The inductor of claim 10, further comprising:

a first connection element, configured to couple to the first sub-wire and the second sub-wire.

12. The inductor of claim 11, further comprising:

a first via, configured to couple to the first sub-wire and the first connection element.

13. The inductor of claim 12, further comprising:

a second via, configured to couple to the first connection element and the second sub-wire.

14. The inductor of claim 13, further comprising:

a second connection element, configured to couple to the third sub-wire and the fourth sub-wire, and disposed with the first connection element in an interlaced manner.

15. The inductor of claim 14, further comprising:

a third via, configured to couple to the third sub-wire and the second connection element.

16. The inductor of claim 15, further comprising:

a fourth via, configured to couple to the second connection element and the fourth sub-wire.

* * * * *